US Patent [19]  
Frick

[11] Patent Number: 4,519,253  
[45] Date of Patent: May 28, 1985

[54] REACTANCE MEASUREMENT CIRCUIT WITH ENHANCED LINEARITY
[75] Inventor: Roger L. Frick, Eden Prairie, Minn.
[73] Assignee: Rosemount Inc., Eden Prairie, Minn.
[21] Appl. No.: 489,856
[22] Filed: Apr. 29, 1983
[51] Int. Cl.³ .............................................. G01L 9/12
[52] U.S. Cl. ...................................... 73/718; 73/724; 331/65
[58] Field of Search ................ 73/701, 708, 718, 724, 73/304 C, 716; 324/60 C, 60 CD, 61 R; 331/65; 361/283

[56] References Cited
U.S. PATENT DOCUMENTS
4,339,750  7/1982  Delacruz ...................... 324/60 CD Primary Examiner—Donald O. Woodiel
Attorney, Agent, or Firm—Kinney & Lange

[57] ABSTRACT

A circuit for measuring the reactance of a reactance sensor which varies responsive to a condition to be sensed, such as pressure, and which provides an output signal representative of the sensed condition is disclosed. The circuit comprises an oscillator coupled to the sensor for providing a time varying oscillator signal to the sensor, and a plurality of rectifiers coupled to the oscillator and to the sensor for providing charging signals to the sensor and for providing discharging signals from the sensor. A control amplifier is coupled to the sensor charging and discharging signals and to the oscillator for providing an input control signal to the oscillator as a function of the sum of at least two sensor signals wherein at least one of the sensor signals is selectively amplified to enhance the relationship between the output signal and the sensed condition.

17 Claims, 3 Drawing Figures

REACTANCE MEASUREMENT CIRCUIT WITH ENHANCED LINEARITY

BACKGROUND OF THE INVENTION

1. Field of the Invention

The present invention relates to linearizing reactance sensor circuitry and more particularly to capacitance transducers for measuring pressure.

2. Prior Art

Practical reactance sensors commonly exhibit transfer functions that can be approximated by:

$$O = MX + NX^2 + QX^3$$

where:
- O = output signal
- X = sensed variable
- M = sensitivity constant
- N = second order nonlinearity constant and
- Q = third order nonlinearity constant It is desired that N and Q be as low as possible to give a desired linear relationship between the output signal, O, and the sensed variable, X. Prior art circuitry allows the third order constant, Q, to be adjusted as desired to minimize the combined effect of the second order term, N, and the third order term, Q. In the present invention substantially in dependent adjustment of the second and third order nonlinearity constants, N and Q, is made possible, resulting in substantially improved performance.

SUMMARY OF THE INVENTION

The present invention comprises a reactance measuring circuit for providing an output signal with enhanced linearity. The circuit comprises a reactance means which varies responsive to a condition to be sensed such as pressure. An oscillator provides a time varying signal to the reactance means. A rectifying means is coupled to the reactance means for providing sensor signals as charging signals to and discharging signals from the reactance means. A control means is coupled to the sensor signals and to the oscillator for providing an input control signal to the oscillator as a function of the sum of at least two sensor signals, wherein at least one of the sensor signals is selectively amplified. The selective amplification of at least one of the sensor signals provides an enhanced relationship between the output signal and the sensed condition.

In one preferred embodiment, the output signal comprises a second order dependence on the sensed parameter. Selective amplification of at least one of the sensor signals compensates for such second order dependency, enhancing the output signal.

In a further preferred embodiment, adjustment of one of the sensor signals is accomplished by an amplifier means. The amplifier means further comprises an impedance network for selective amplification of one of the sensor signals as a function of the impedance of the impedance network. Such selective amplification of one of the sensor signals has a predominant effect on second order linearity of the output signal with respect to the sensed condition. Use of an operational amplifier comprising the amplifier means improves the relationship between the output signal and the sensed parameter without substantially adversely affecting biasing or responses of associated circuitry, providing second order linearity adjustment.

The second order linearity adjustment when combined with other existing circuit adjustments provides an improved output signal from lower to upper range limits. Thus, span, zero and range adjustments can be made without need for readjustment of linearity.

DETAILED DESCRIPTION OF THE PREFERRED EMBODIMENTS

Figure 1:
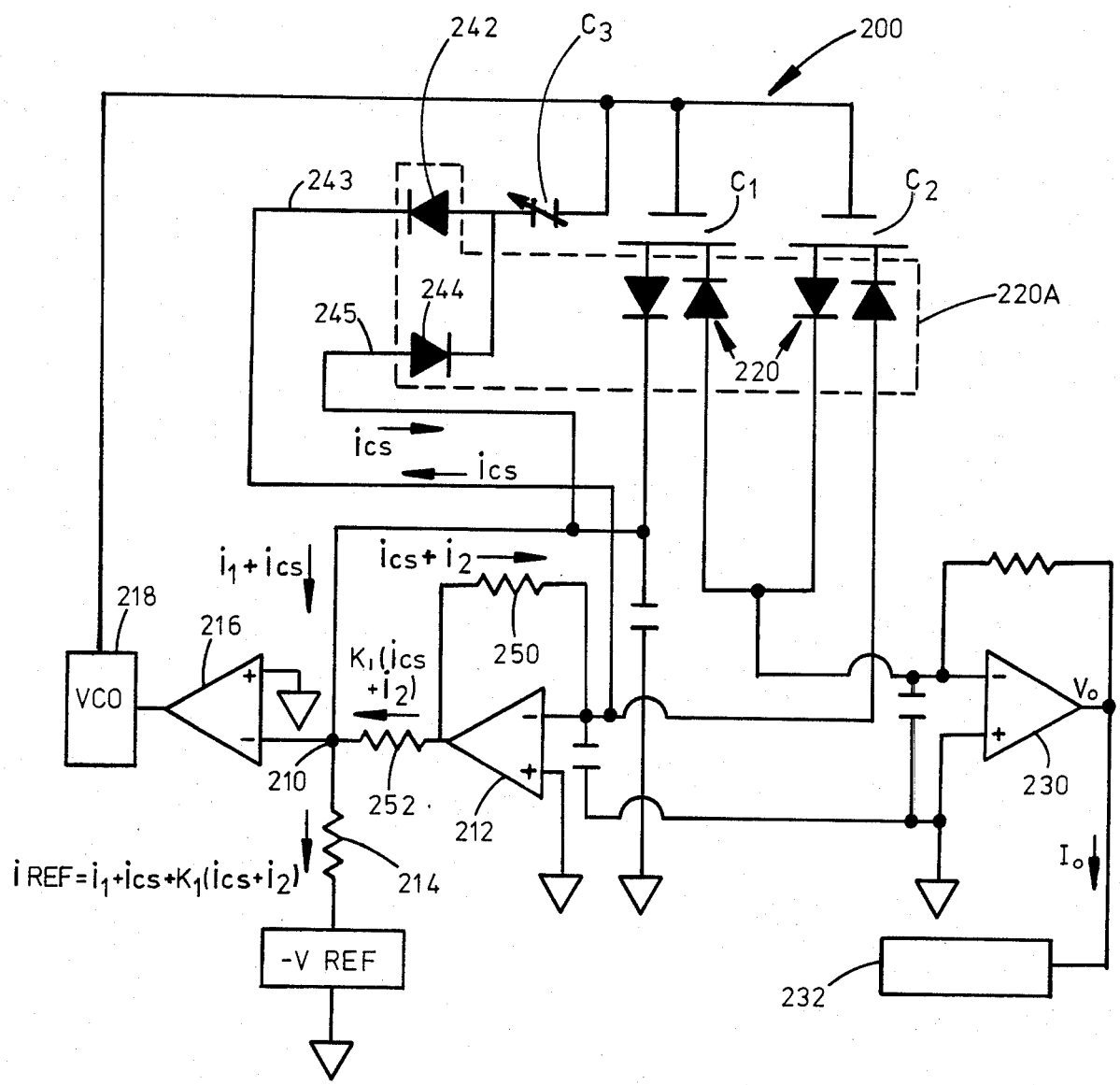
FIG. 1 is a schematic representation of a reactance measurement circuit according to the present invention.

In FIG. 1, a circuit embodiment of the present invention shown generally at 200 preferably is used in conjunction with an AC reactance type differential pressure sensor cell, and preferably has a pair of capacitors $C_1$ and $C_2$ at least one of which is variable, responsive to a parameter, preferably pressure. FIG. 1 basically is the circuit of FIG. 3 of U.S. Pat. No. 4,381,677 to Ruesch, Frick and Grindheim which is herein incorporated by reference and assigned to the same assignee as the present application, except for minor differences as noted herein. Operation of circuit 200 is fully described in U.S. Pat. No. 4,381,677 except as further explained herein.

A sum point means 210 also known as current summing node 210 is fed a first discharging signal or, first current $i_1$ responsive of the capacitance of capacitor $C_1$ and a second charging signal or, second current $i_2$ responsive of the capacitance of capacitor $C_2$ from an amplifier means 212 also known as inverting amplifier 212 for selectively amplifying and inverting second current $i_2$. Summing node 210 sums the first and second currents as by arithmetically combining the currents. The furst and second currents can be charging or discharging signals in other preferred embodiments. A control means 216, also known as control amplifier 216 has its non-inverting input (as indicated by the plus (+) sign) coupled to circuit common and its inverting input (as indicated by the minus (−) sign) coupled to summing node 210 and produces an output signal to control the frequency of an oscillator means 218, also known as voltage controlled oscillator 218. Oscillator 218 repetitively charges capacitors $C_1$ and $C_2$ through a rectification means shown generally at 220 with substantially constant amplitude, variable frequency oscillating voltage signals ($V_{pp}$ peak to peak amplitude), the frequency of which is controlled responsive to the changes of the capacitance of $C_1$ and $C_2$. Capacitors $C_1$ and $C_2$ repetitively discharge through rectification means 220 responsive to their repetitive charging. Thus capacitor $C_1$ has first signals for charging and discharging and capacitor $C_2$ has second signals for charging and discharging. Rectification means 220 rectifies the currents $i_1$ and $i_2$, representative of $C_1$ and $C_2$ which result from the repetitive charging and discharging of $C_1$ and $C_2$. It is noted that the circuit 200 can also operate with a constant frequency varying voltage provided by oscillator 218, with the voltage controlled by control amplifier 216.

An adjustable capacitor $C_3$ is coupled to summing node 210 through diodes 242 and 244 to provide a current $i_{cs}$ to summing node 210 through lines 243 and 245 respectively. Diodes 242 and 244 may be included in rectification means 220A for increased thermal stability. It is noted that $C_3$ is coupled to summing node 210 through two separate paths, diodes 242 and 244 and lines 243 and 245 respectively, such that the capacitance of $C_3$ need not be doubled as stated in U.S. Pat. No. 4,381,677 where capacitor $C_3$ is coupled to summing node 210 only through diode 244. Coupling capacitor $C_3$ through both diodes 244 and 242 provides approximately twice the current $i_{cs}$ therefore eliminating the need to double the capacitance. Amplifier 212 has an output and an inverting input (as indicated by the minus (−) sign), the output being coupled to the inverting input through a first resistor 250 and, the output being coupled to summing node 210 through second resistor 252, neither of said resistors having been indicated by number in FIG. 3 of U.S. Pat. No. 4,381,677. An output amplifier 230 having an output and an inverting input (as indicated by the minus (−) sign) is coupled at its inverting input to rectification means 220 and provides an output signal $V_0$ to a suitable implementation means 232, such as a two wire current control, readout device or the like which draws an output current signal $I_0$.

Amplifier 212 selectively amplifies second current $i_2$ and capacitor $C_3$ current $i_{cs}$. Currents $i_2$ and $i_{cs}$ are preferably amplified by a factor $K_1$ which is a ratio of an impedance means comprising the resistance of resistor 250 divided by the resistance of resistor 252. Second current $i_2$ and current $i_{cs}$ are selectively amplified without substantially adversely affecting the biasing or response of control amplifier 216 or other associated circuitry. Currents $i_1$, $K_1 i_2$, and the currents from capacitor $C_3$, $(1+K_1) i_{cs}$ are fed into summing node 210 and flow through a resistor 214 to a reference, −V REF, producing a voltage at summing node 210 responsive to the first and second signals. The currents, $K_1 i_{cs}$ and $K_1 i_2$ are different from that shown in FIG. 3 of U.S. Pat. No. 4,381,677.

The capacitance of capacitors $C_1$ and $C_2$ change in response to a difference in pressure. The output signal $I_0$ is of the form:

$$I_0 = MP + NP^2 + QP^3 \qquad 1$$

where:
$I_0$ = output signal of amplifier 230
P = differential pressure
M = sensitivity constant
N = second order nonlinearity constant and
Q = third order nonlinearity constant The output signal $I_0$ is essentially a first, second and third order function of differential pressure which can be approximated in terms of capacitance as:

$$I_0 \propto \frac{C_1 - C_2}{C_1 + K_1 C_2 - (1+K_1) C_3} \qquad \text{Equation 2}$$

where:
$I_0$ = output signal of amplifier 230
$C_1$ = capacitance of $C_1$
$C_2$ = capacitance of $C_2$
$K_1$ = ratio of (resistance of resistor 250/resistance of resistor 252) and and, $C_3$ = capacitance of $C_3$ The capacitances of $C_1$ and $C_2$ can be expressed as:

$$C_1 = \frac{A}{1-BP} + C \qquad \text{Equation 3}$$

$$C_2 = \frac{D}{1-EP} + F \qquad \text{Equation 4}$$

where:
A = active rest capacitance of $C_1$
B = normalized inverse spring constant of $C_1$
C = stray capacitance of $C_1$
D = active rest capacitance of $C_2$
E = normalized inverse spring constant of $C_2$
F = stray capacitance of $C_2$ and
P = differential pressure.

Combining Equations 2, 3 and 4 yields:

$$\frac{A - D + C - F + (AE + DB + (C-F)(E-B))P - (C-F)BEP^2}{(A + K_1 D + C + K_1 F - C_3(1+K_1)) + (AE - K_1 DB + (C + K_1 F - C_3(1+K_1))(E-B))P - (C + K_1 F - C_3(1+K_1))BEP^2} \qquad \text{Equation 5}$$

Equation 5 can be simplified using letters G, H, I, J, K and L as coefficients corresponding to the actual coefficients of pressure P in equation 5:

$$I_0 \propto \frac{G + HP + IP^2}{J + KP + LP^2} \qquad \text{Equation 6}$$

where:
$G = A - D + C - F$
$H = AE + DB + (C-F)(E-B)$
$I = -(C-F)BE$
$J = A + K_1 D + C + K_1 F - C_3(1+K_1)$
$K = AE - K_1 DB + (C - K_1 F - C_3(1+K_1))(E-B)$ and
$L = -(C + K_1 F - C_3(1+K_1))BE$ For Equation 6 to be linear with respect to pressure P, the following two equations should be satisfied:

$$L = 0 \qquad \text{Equation 7}$$

$$\text{and,} \quad \frac{IJ^2}{K^2} - \frac{HJ}{K} + G = 0 \qquad \text{Equation 8}$$

Equation 8 is derived by setting L=0 in Equation 6 and dividing the numerator in Equation 6 by the denominator in Equation 6 until a first order pressure term appears leaving a remainder which is set equal to zero.

Figure 2:
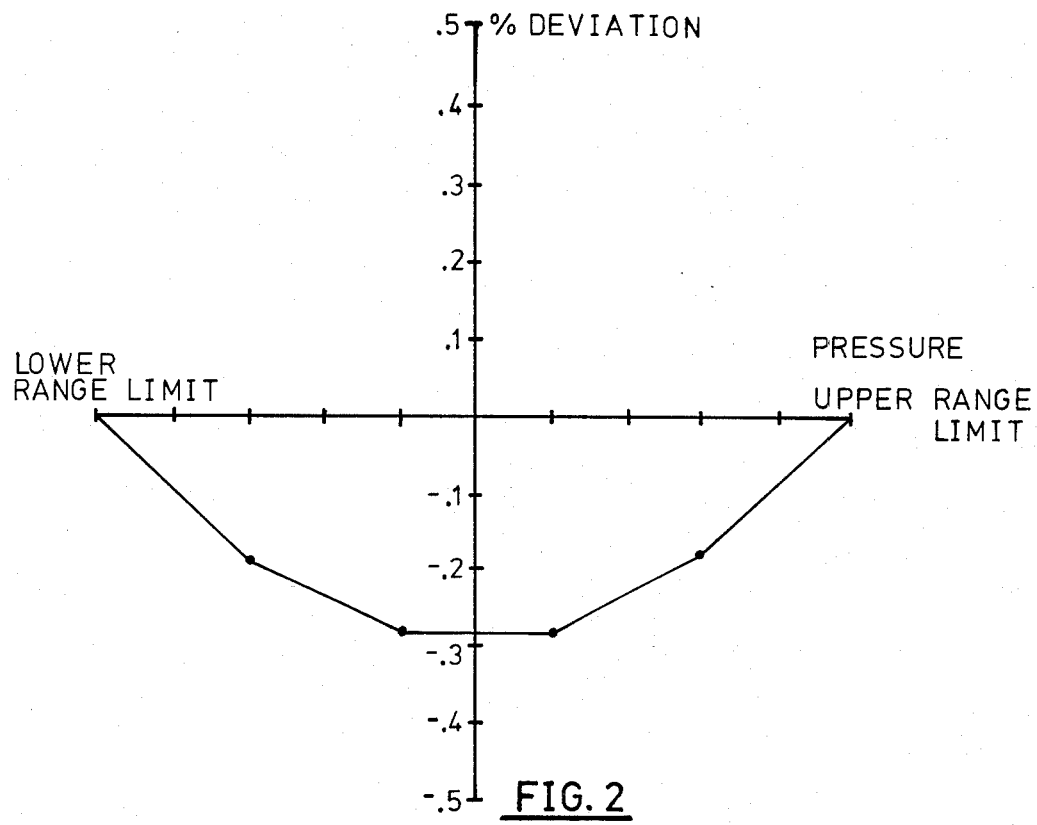
FIG. 2 is a graph of typical data of a prior art circuit, having third order dependence eliminated, expressed as endpoint linearity.

Varying $K_1$ and varying the capacitance of capacitor $C_3$, provides sufficient flexibility to substantially satisfy Equations 7 and 8. Adjustment of the capacitance of $C_3$ provides a predominantly third order adjustment which in the past has been used to adjust the linearity of output signal $I_0$ over selected ranges of pressure. In FIG. 2, a graph of typical data, where the output signal $I_0$ is a 4 to 20 milliampere signal (as for example in FIG. 3 of U.S. Pat. No. 4,381,677), expressed as terminal based linearity of output signal $I_0$ versus pressure is shown with capacitor $C_3$ adjusted to minimize third order dependence. A second order differential pressure dependency remains having a maximum deviation from linear of approximately −0.29 percent. Adjustment of $K_1$ by selectively trimming resistors 250 and 252 results in a predominantly second order dependency control. In one embodiment resistors 250 and 252 preferably each comprise at least two resistors coupled in parallel, at least one of which is trimmable as by a laser to vary the parallel resistance. $K_1$ is then the ratio of the equivalent resistance of the parallel resistors of resistor 250 divided by the equivalent resistance of the parallel resistors of resistor 252. When capacitor $C_3$, resistor 250 and resistor 252 are correctly selected, a substantially linearized function results and Equations 7 and 8 are substantially satisfied. Resistors 250 and 252 can also be variable as a function of pressure or other parameter affecting second order differential pressure dependency.

The present invention provides enhanced linearity from lower to upper pressure range limits allowing adjustment of span, zero and range (standard process measurement terminology) of the differential pressure transmitter without readjustment of linearity. Linearity is also enhanced when compared to linearizing by only utilizing third order adjustments. To partially compensate for second order linearity by adjusting capacitor $C_3$, the third order dependence is not minimized, but optimized to account for both second and third order dependence, leaving both a third order dependence and a second order dependence. By selectively choosing resistors 250 and 252 and capacitor $C_3$, both second and third order dependencies are substantially independently minimized resulting in a substantially linear relationship between the output signal $I_0$ and pressure from lower to upper pressure range limits, enabling span and zero changes to be made over the entire range of pressure from the lower range limit to the upper range limit without need for readjustment of linearity.

Figure 3:
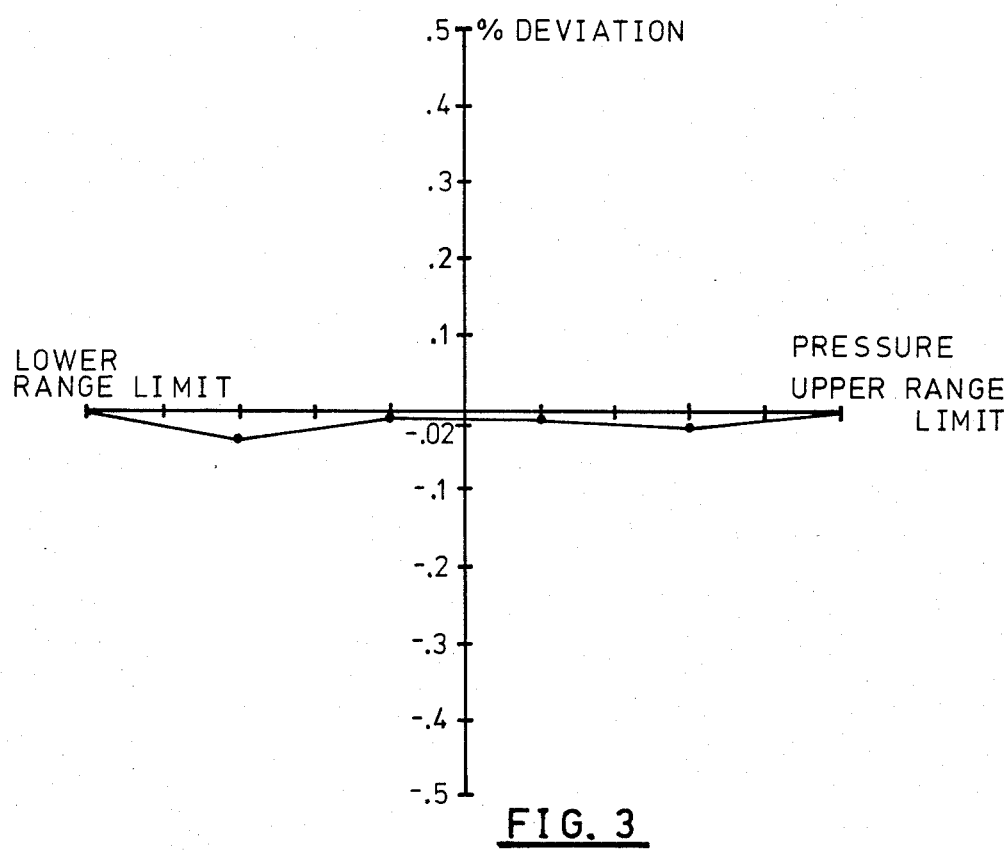
FIG. 3 is a graph of end point linearity of a circuit constructed according to FIG. 1.

In FIG. 3 a graph of terminal based linearity of output signal $I_0$ (a 4 to 20 milliampere signal) from a circuit constructed according to FIG. 1 shows enhanced terminal based linearity of output signal $I_0$ with capacitor $C_3$ and resistors 250 and 252 selected to improve linearity. The maximum deviation from linear is less than 0.04 percent. Capacitor $C_3$ is selected to minimize third order dependence and resistors 250 and 252 are selected to minimize second order dependence. Comparing FIGS. 2 and 3 by subtracting their respective maximum deviations from linear $(-0.29-(-0.04)= -0.25$ percent) shows that unadjusted second order linearity is the largest uncorrected dependence after third order dependence is compensated.

It has been found that a $K_1$ of between 0.900 and 1.100, is sufficient to compensate for second order non-linearity without adversely affecting associated circuitry. Preferably, $K_1$, varies between 0.975 and 1.025. With $K_1$ individually selected between 0.975 and 1.025 second order dependence is minimized in virtually every case. The above constructed circuit comprised resistor 250 having an equivalent resistance of 27,807 ohms and resistor 252 having an equivalent resistance of 28,088 ohms, resulting in a $K_1$ of 0.990.

In a further preferred embodiment of the present invention as seen in FIG. 1 of U.S. Pat. No. 4,381,677, resistors 54 and 56 are varied to provide second order linearity adjustment and enhancement of the output signal. Resistors 64 and 66 also can similarly be varied.

In FIG. 2 of U.S. Pat. No. 4,381,677, it is within the scope of the present invention to adjust $C_3$ and amplify $i_1$, $i_2$ or both in a manner described above to enhance the output signal.

What is claimed is:

1. A circuit for measuring a variable reactance means having at least two reactances, at least one of which varies responsive to a condition being sensed, the circuit providing an output signal representative of the sensed condition which has certain non-linearities with respect to the condition being sensed, the circuit comprising:
   oscillator means coupled to the reactance means for providing a time varying oscillator signal to the variable reactance means;
   rectification means coupled to the reactance means for providing separate charging signals to and separate discharging signals from each of the reactances comprising the reactance means, the charging and discharging signals being a function of the reactances of the reactance means; and
   control means coupled to the rectification means and to the oscillator means for providing an input control signal to the oscillator means; and
   means for selectively amplifying at least one of the charging and discharging signals to adjust the input control signal from the control means and then to adjust the oscillator signal as a function of the selected amplified signal to substantially compensate for non-linearities of the output signal with respect to the condition being sensed to achieve a predetermined relationship between the output signal and the sensed condition.

2. The circuit of claim 1 wherein the reactance means comprises at least one varying capacitor.

3. The circuit of claim 1 wherein the sensed parameter is pressure.

4. The circuit of claim 1 wherein the reactance means comprises at least a first and a second reactance means responsive to the sensed condition at least one of which is variable.

5. The circuit of claim 4 further comprising:
   a first charging signal and a first discharging signal responsive to the first reactance means, and a second charging signal and a second discharging signal responsive to the second reactance means.

6. The circuit of claim 5 wherein the selectively amplified signal is the first discharge signal, and further comprising:
   sum point means coupled to the control means and to the rectification means for combining the amplified first discharge signal and at least one of the second charging and second discharging signals.

7. The circuit of claim 1 wherein the output signal comprises a second order dependence on the sensed parameter and wherein the selectively amplified signal substantially compensates for the second order sensed parameter dependence of the output signal.

8. The circuit of claim 1 and further comprising:
   output amplifier means coupled to the rectification means for differentially summing at least one of the first charging and first discharging signals and at least one of the second charging and second discharging signals.

9. The circuit of claim 8 and further comprising:
   output means coupled to the output amplifier means for providing the output signal which has a substantially linear relationship with pressure.

10. A circuit for measuring a variable reactance means having at least first and second reactances, at least one of which varies responsive to a condition to be sensed, the circuit providing an output signal representative of the sensed condition, the circuit comprising:
    oscillator means coupled to the reactance means for providing a time varying oscillator signal to the variable reactance means;
    rectification means coupled to the reactance means for providing first and second charging signals to and first and second discharging signals from the respective first and second reactances, the charging and discharging signals being a function of the reactances of the reactance means;

amplifier means coupled to selectively amplify a selected one of the first charging and first discharging signals;

sum point means coupled to the output of the amplifier and to the rectification means for combining the selectively amplified signal and at least one of the second charging and second discharging signals; and control means coupled to the sum point means and to the oscillator means for providing an input control signal to the oscillator means to adjust the charging and discharging signals as a function of the input control signal, the selectively amplified signal substantially compensating for non-linearities of the output signal with respect to the condition being measured to achieve a predetermined relationship between the output signal and the sensed condition.

11. The circuit of claim 10 wherein the amplifier means further comprises:

impedance network means for selectively controlling the relationship between the selected signal and the selectively amplified signal.

12. The circuit of claim 11 wherein the amplifier means further comprises a first operational amplifier having an inverting input and an output.

13. The circuit of claim 12 wherein the impedance network means comprises:

first impedance means coupled between the inverting input and the output of the first amplifier; and second impedance means coupled between the output of the first amplifier and the sum point means wherein the relationship between the first and second impedance means determines the selective amplification of the selected signal.

14. The circuit of claim 13 wherein the selected signal is selectively amplified as a function of the impedance of the first impedance means divided by the impedance of the second impedance means.

15. The circuit of claim 13 wherein the first and second impedance means comprise first and second adjustable resistors, respectively and wherein the ratio of the first resistor to the second resistor is representative of the selective amplification of the selected signal.

16. The circuit of claim 12 wherein the control means comprises a second amplifier having an input coupled to the sum point means and an output coupled to the oscillator means for providing the input control signal to the oscillator means.

17. The circuit of claim 16 wherein the sum point means provides a signal representative of the sum of the selectively amplified signal and at least one of the second charging and second discharging signals to the input of the second amplifier.

* * * * *

UNITED STATES PATENT AND TRADEMARK OFFICE
CERTIFICATE OF CORRECTION

PATENT NO. : 4,519,253

DATED : May 28, 1985

INVENTOR(S) : Roger L. Frick

It is certified that error appears in the above-identified patent and that said Letters Patent is hereby corrected as shown below:

In column 2, line 40, the word "furst" should read --first--.

In column 3, line 47, the numeral "1" at the right-hand margin should read --Equation 1--.

In column 3, line 67, delete the word "and" at the end of the line.

In column 4, line 20, the phrase "$I_0 \alpha$" is missing from the very beginning of the equation.

In column 4, line 20, the words "Equation 5" are missing from the end of the equation.

Signed and Sealed this

Fifteenth Day of October 1985

[SEAL]

Attest:

Attesting Officer

DONALD J. QUIGG

Commissioner of Patents and Trademarks—Designate